US012111947B2

(12) United States Patent
Coenders et al.

(10) Patent No.: US 12,111,947 B2
(45) Date of Patent: Oct. 8, 2024

(54) MULTI-ZONE SECURE ARTIFICIAL INTELLIGENCE EXCHANGE AND HUB

(71) Applicant: Equinix, Inc., Redwood City, CA (US)

(72) Inventors: Guido Franciscus Wilhelmus Coenders, Amsterdam (NL); Kaladhar Voruganti, San Jose, CA (US); Vijaay Doraiswamy, Fremont, CA (US); Purvish Purohit, Sunnyvale, CA (US); Mahendra Malviya, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 18/175,090

(22) Filed: Feb. 27, 2023

(65) Prior Publication Data

US 2023/0222239 A1  Jul. 13, 2023

Related U.S. Application Data

(62) Division of application No. 17/097,595, filed on Nov. 13, 2020, now Pat. No. 11,593,500.

(Continued)

(51) Int. Cl.
*G06F 21/62* (2013.01)
*G06Q 10/0631* (2023.01)
(Continued)

(52) U.S. Cl.
CPC ... *G06F 21/6218* (2013.01); *G06Q 10/06315* (2013.01); *G06Q 20/1235* (2013.01);
(Continued)

(58) Field of Classification Search
CPC .......... G06F 21/6218; G06Q 10/06315; G06Q 20/1235; G06Q 30/0609; H04L 63/0218;
(Continued)

(56) References Cited

U.S. PATENT DOCUMENTS 7,702,639 B2 * 4/2010 Stanley .................. G06F 16/20
707/999.1
9,886,267 B2 2/2018 Maheshwari et al.
(Continued)

OTHER PUBLICATIONS

U.S. Appl. No. 17/019,001, filed Sep. 11, 2020, naming inventors Kempf et al.
(Continued)

*Primary Examiner* — El Hadji M Sall
(74) *Attorney, Agent, or Firm* — Shumaker & Sieffert, P.A.

(57) ABSTRACT

In general, this disclosure describes a multi-zone secure AI exchange. The multi-zone secure AI exchange may be implemented in a multi-cloud, multi-data center environment, where each zone may be in a different cloud or data center. The multi-zone secure AI exchange may include a data repository, a data exchange, and shared services. The data repository may be configured to store algorithms and datasets, each having a respective owning user. The data exchange may receive datasets and algorithms from the data repository, and may perform the algorithms to produce output data. Each of the data repository, data exchange, and shared services may have a different level of security. The data repository may implement the highest level of security, allowing the owner user, and only the owning user, to control how their data and algorithms move in and out of the data repository, or are changed while in the data repository.

11 Claims, 9 Drawing Sheets

Related U.S. Application Data

(60) Provisional application No. 62/936,117, filed on Nov. 15, 2019.

(51) Int. Cl.
  *G06Q 20/12* (2012.01)
  *G06Q 30/0601* (2023.01)
  *H04L 9/40* (2022.01)
  *H04L 67/10* (2022.01)
  *H04L 67/51* (2022.01)

(52) U.S. Cl.
  CPC ..... *G06Q 30/0609* (2013.01); *H04L 63/0218* (2013.01); *H04L 63/102* (2013.01); *H04L 67/51* (2022.05); *H04L 67/10* (2013.01)

(58) Field of Classification Search
  CPC ....... H04L 63/102; H04L 67/51; H04L 67/10; H04L 63/105
  See application file for complete search history.

(56) References Cited

U.S. PATENT DOCUMENTS

| | | | |
|---|---|---|---|
| 9,922,116 B2 | 3/2018 | Rayes et al. | |
| 9,948,552 B2 | 4/2018 | Teng et al. | |
| 9,996,804 B2 | 6/2018 | Bowers et al. | |
| 10,129,078 B2 | 11/2018 | Kumar et al. | |
| 10,318,882 B2 | 6/2019 | Brueckner et al. | |
| 10,355,989 B1 | 7/2019 | Panchal et al. | |
| 10,771,252 B1 | 9/2020 | Teng et al. | |
| 11,049,349 B2* | 6/2021 | Onischuk | G07C 13/00 |
| 11,483,201 B2 | 10/2022 | Wince et al. | |
| 2010/0179832 A1 | 7/2010 | Van Deursen et al. | |
| 2013/0268357 A1 | 10/2013 | Heath | |
| 2016/0217387 A1 | 7/2016 | Okanohara et al. | |
| 2016/0358098 A1 | 12/2016 | Duesterwald et al. | |
| 2017/0214696 A1 | 7/2017 | Cleaver et al. | |
| 2017/0242876 A1 | 8/2017 | Dubost | |
| 2017/0344910 A1 | 11/2017 | Wu | |
| 2017/0364539 A1* | 12/2017 | Jacob | G06N 5/04 |
| 2018/0285839 A1 | 10/2018 | Yang et al. | |
| 2019/0155633 A1 | 5/2019 | Faulhaber, Jr. et al. | |
| 2019/0332921 A1 | 10/2019 | Rodriguez | |
| 2020/0175590 A1 | 6/2020 | Huo | |
| 2021/0150411 A1 | 5/2021 | Coenders et al. | |

OTHER PUBLICATIONS

Prosecution History from U.S. Appl. No. 17/097,595, dated Oct. 11, 2022 through Dec. 22, 2022, 24 pp.

Sarpatwar et al., "Towards Enabling Trusted Artificial Intelligence via Blockchain," Springer International Publishing, Advances in Databases and Information Systems, Apr. 25, 2019, pp. 137-153.

* cited by examiner

MULTI-ZONE SECURE ARTIFICIAL INTELLIGENCE EXCHANGE AND HUB

This application is a divisional of U.S. patent application Ser. No. 17/097,595, filed Nov. 13, 2020, which claims the priority benefit of U.S. Provisional Patent Application Ser. No. 62/936,117, filed Nov. 15, 2019, the entire contents of both of which are incorporated herein by reference.

TECHNICAL FIELD

The disclosure relates to computer networks and, more specifically, to a networked system facilitating secure exchange of artificial intelligence models and data.

BACKGROUND

Cloud computing refers to the use of dynamically scalable computing resources accessible via a network, such as the Internet. The computing resources, often referred to as a "cloud," can be used for data storage and to provide services to users. These services may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Artificial Intelligence (AI) services are now being provided via cloud architectures. For example, training data can be provided from cloud storage systems and used to train a machine learning model. Further, partially or fully trained machine learning models can be provided from cloud storage systems. Moreover, training algorithms can be stored and performed by cloud-based service providers.

SUMMARY

In general, this disclosure describes a multi-zone secure AI exchange. The multi-zone secure AI exchange may be implemented in a multi-cloud, multi-data center environment, where each zone may be in a different cloud or data center. If implemented in a cloud environment, the clouds may be private clouds, public clouds, or a combination of the two. As an example, the multi-zone secure AI exchange may include a data repository, a data exchange, and shared services, where each of the three components may be implemented in a different cloud or data center. The data repository may be configured to store algorithms and datasets, where each algorithm and dataset has a respective owning user. The data exchange may receive datasets and algorithms from the data repository, and may perform the algorithms to produce output data. In some aspects, the output data may be copied from the data exchange by non-owning users. In some aspects, datasets and algorithms may be copied from the exchange by non-owning users.

Each of the data repository, data exchange, and shared services may have a different level of security. For example, the data repository may implement the highest level of security, allowing the owner user, and only the owning user, to control how their data and algorithms move in and out of the data repository, or are changed while in the data repository.

The data exchange may implement a lower level of security than the data repository. The data exchange may allow data or algorithms to be received from the data repository at the request of an owning user. The security configuration for the data exchange may allow non-owning users to receive output data produced by an algorithm. Optionally, the data exchange may, with the permission of the owner, allow data or algorithms placed in the data exchange to be copied from the data exchange.

The shared services may be configured at a lowest level of security when compared with the data repository and data exchange. The security configuration of the shared services may require the user be authenticated and authorized using a trusted identity. Once authenticated and/or authorized, a user may make requests with respect to datasets and algorithms in the data repository and data exchange. The requests may be issued by both non-owning and owning users with respect to the algorithms and datasets. However, such requests may, if performed, be subject to the respective security requirements of the data repository and data exchange.

The aspects described above and further aspects described herein may provide advantages over conventional systems. For example, many conventional systems maintain a single security configuration for data and applications (e.g., analytics applications) that operate on the data. Thus, a technical problem with such conventional systems is that they do not provide the flexibility to maintain strict control of the data and algorithms while allowing other users to utilize the data or algorithms for particular allowed purposes. As a technical solution to this technical problem, the techniques described herein provide a multi-zone security system in which users may allow their data or algorithms to be used without giving up control of the data or algorithms. As an example practical application, a marketplace application may allow owning users of datasets and algorithms to store their datasets and algorithms in a data repository with a very high level of security. The users may control placement of their datasets or algorithms into a trusted data exchange, thereby allowing the data and algorithms to be used by non-owning third parties under conditions satisfactory to the owning party. Accordingly, this architecture may inhibit security exposures to limit the impact of a breach to a particular zone. For example, if a data marketplace is compromised, the provider's data is not reachable from the data marketplace (either data sitting in a secure repository or data sitting in the exchange zones). If a 3rd party service is compromised, the provider's private data sources are not similarly compromised. Moreover, at least in some examples, data owners will always stay in control of their data (whether at rest or in transit), even if such data is copied to the exchange zone.

In addition, or in the alternative, an AI exchange as described herein may allow a bifurcation of the data marketplace and the AI exchange. For example, data marketplace providers may deploy marketplace control planes in or near public clouds, while an AI exchange provided by one or more of the data marketplace providers (or a consortium or third-party, for instance) can execute in either public clouds, private clouds, or neutral co-location facilities. A co-location facility provider may deploy the AI exchange.

Consequently, management and operation of the AI exchange may remain neutral and offer algorithm training and other services while partnering with data marketplace software providers having respective stacks running in public clouds. The AI exchange techniques may also avoid cloud lock-in concerns by consortia using the marketplace.

An AI exchange as described herein may also allow users to leverage services from multiple clouds as part of a single data marketplace namespace as part of an integrated AI hub, in which third-party analytics provider software is seamlessly integrated into the marketplace control plane. In some examples, data can be exchanged in multiple marketplaces. Further, the AI exchange as described herein may facilitate data and algorithm level peering In one example, a system includes a data repository associated with a first set of one or more security parameters, the data repository configured to store a plurality of datasets and a plurality of algorithms, each of the plurality of datasets associated with a corresponding dataset owner and each of the plurality of algorithms associated with a corresponding algorithm owner; a data exchange associated with a second set of one or more security parameters, the data exchange configured to: receive a dataset of the plurality of datasets and an algorithm of the plurality of algorithms, and selectively allow access to the dataset and the algorithm in accordance with the second set of one or more security parameters; and a shared service associated with a third set of one or more security parameters, the shared service including a marketplace application configured to receive commands from dataset owners and algorithm owners, the commands including commands to grant, to the algorithm, read access to the dataset in the data exchange.

In one example, a data exchange includes one or more processors; and a computer-readable medium having instructions that, when executed, cause the one or more processors to: receive, in response to a command issued by an application associated with a first set of security parameters, one or more of a plurality of datasets and one or more of a plurality of algorithms from a data repository, the data repository configured to store the plurality of datasets and the plurality of algorithms, each of the plurality of datasets associated with a corresponding dataset owner and each of the plurality of algorithms associated with a corresponding algorithm owner, the data repository associated with a second set of security parameters, selectively allow access to the one or more of the plurality of datasets by the one or more of the plurality of algorithms in accordance with the first set of one or more security parameters, and selectively allow access to result data produced by the one or more of the plurality of algorithms in accordance with the first set of one or more security parameters; wherein the data exchange is associated with a third set of one or more security parameters.

In one example, a method includes receiving, from a data repository, an algorithm owned by a first user; receiving, from the data repository, a dataset owned by a second user; generating result data by performing, by the data exchange, the algorithm using the dataset as input; and making the result data available for use by a requesting user.

In another example, this disclosure describes a method that includes receiving, by an application of a shared services system, a transaction request, the transaction request specifying an algorithm owned by an algorithm owner and a dataset owned by a dataset owner for use as input to the algorithm, the algorithm and the dataset stored in a data repository; sending, by the application, a first message to the data repository, the first message comprising a request to copy the algorithm and the dataset to a data exchange; and after the algorithm and dataset have been copied from the data repository to the data exchange, sending, by the application, a second message to the data exchange, the second message comprising a request to perform the algorithm using the dataset as input.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1A:
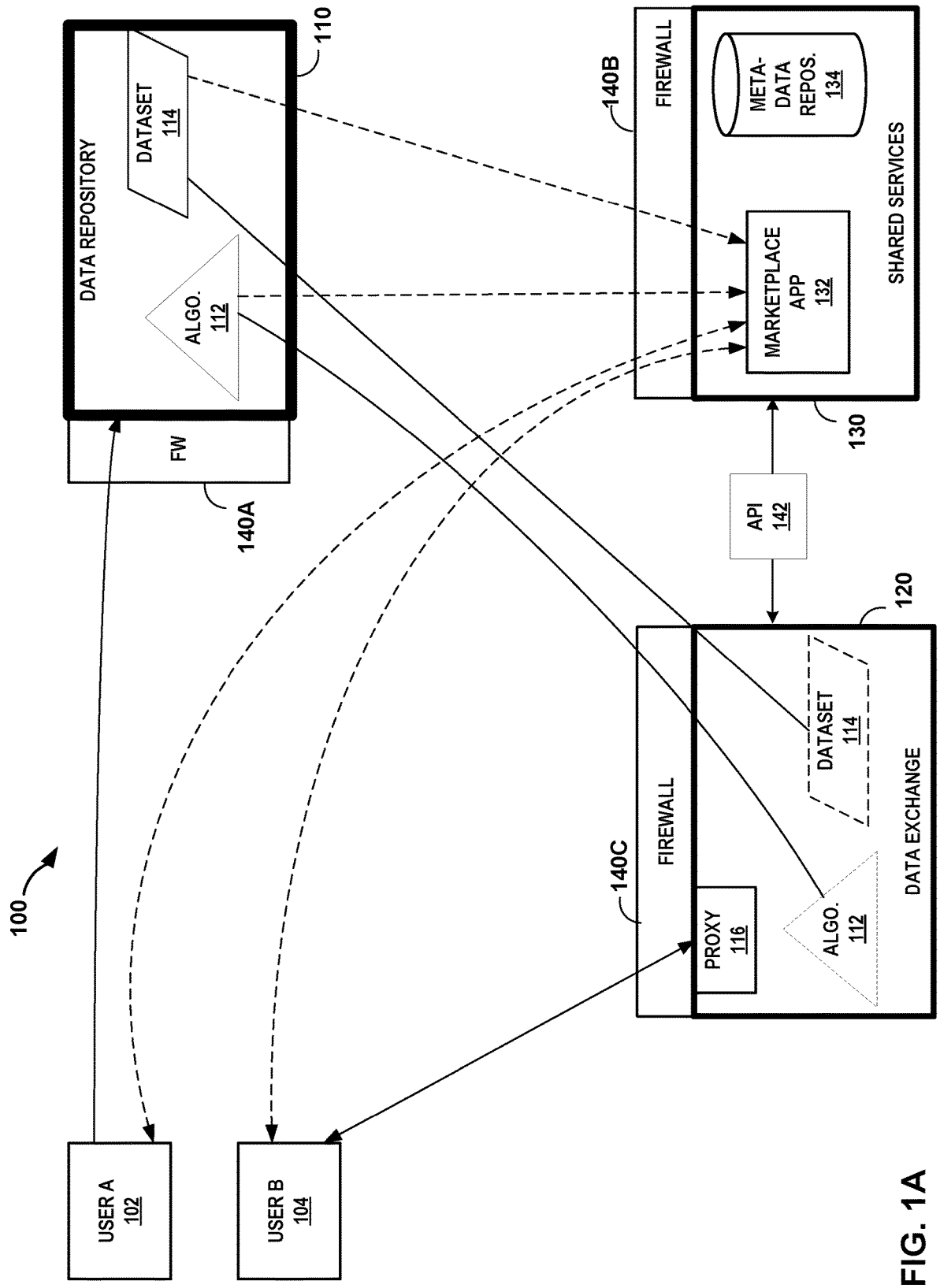
FIGS. 1A-1C are block diagrams that illustrate conceptual views of a multi-zone secure artificial intelligence exchange according to techniques described herein.
Figure 1B:
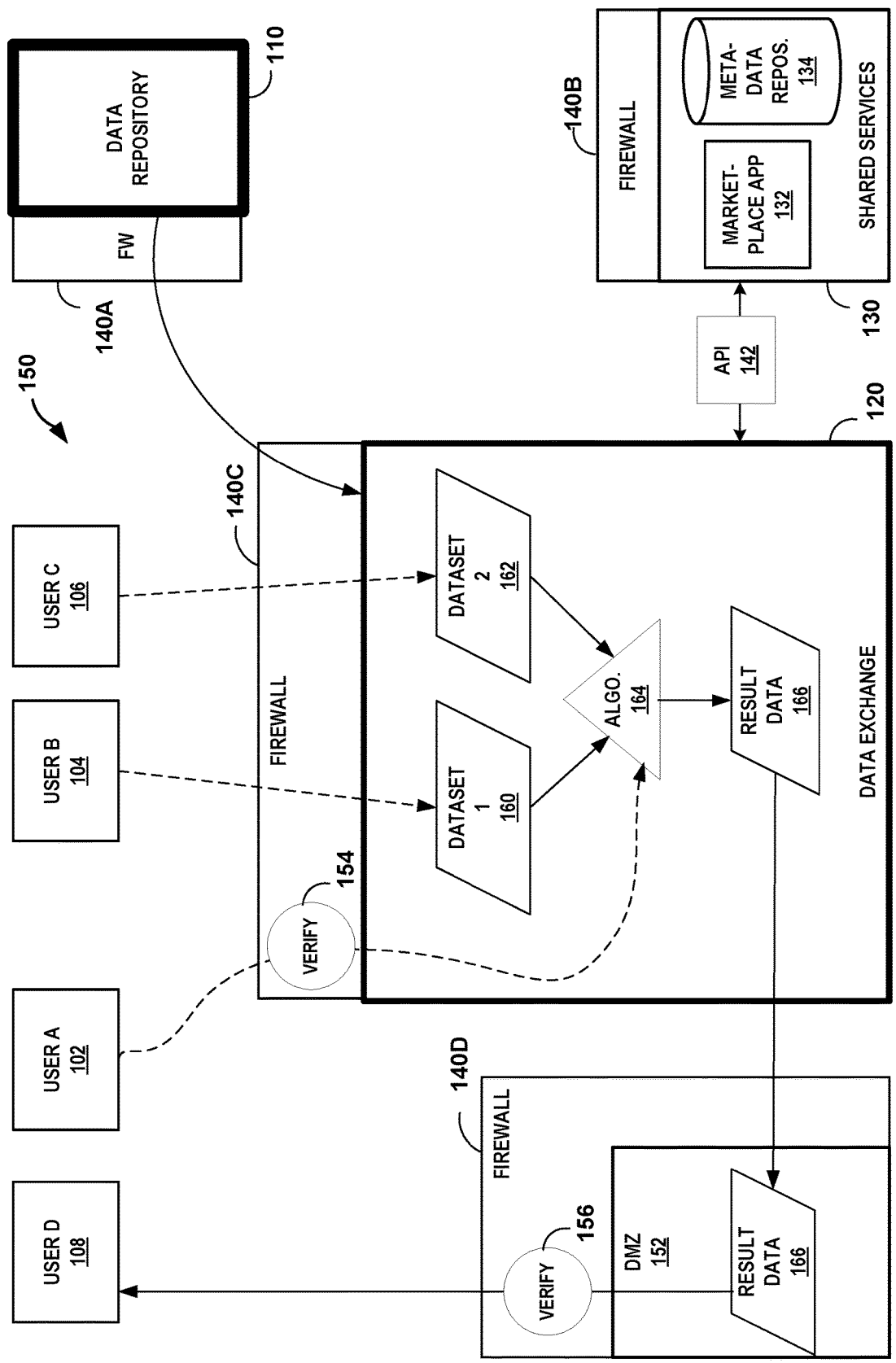
Figure 1C:
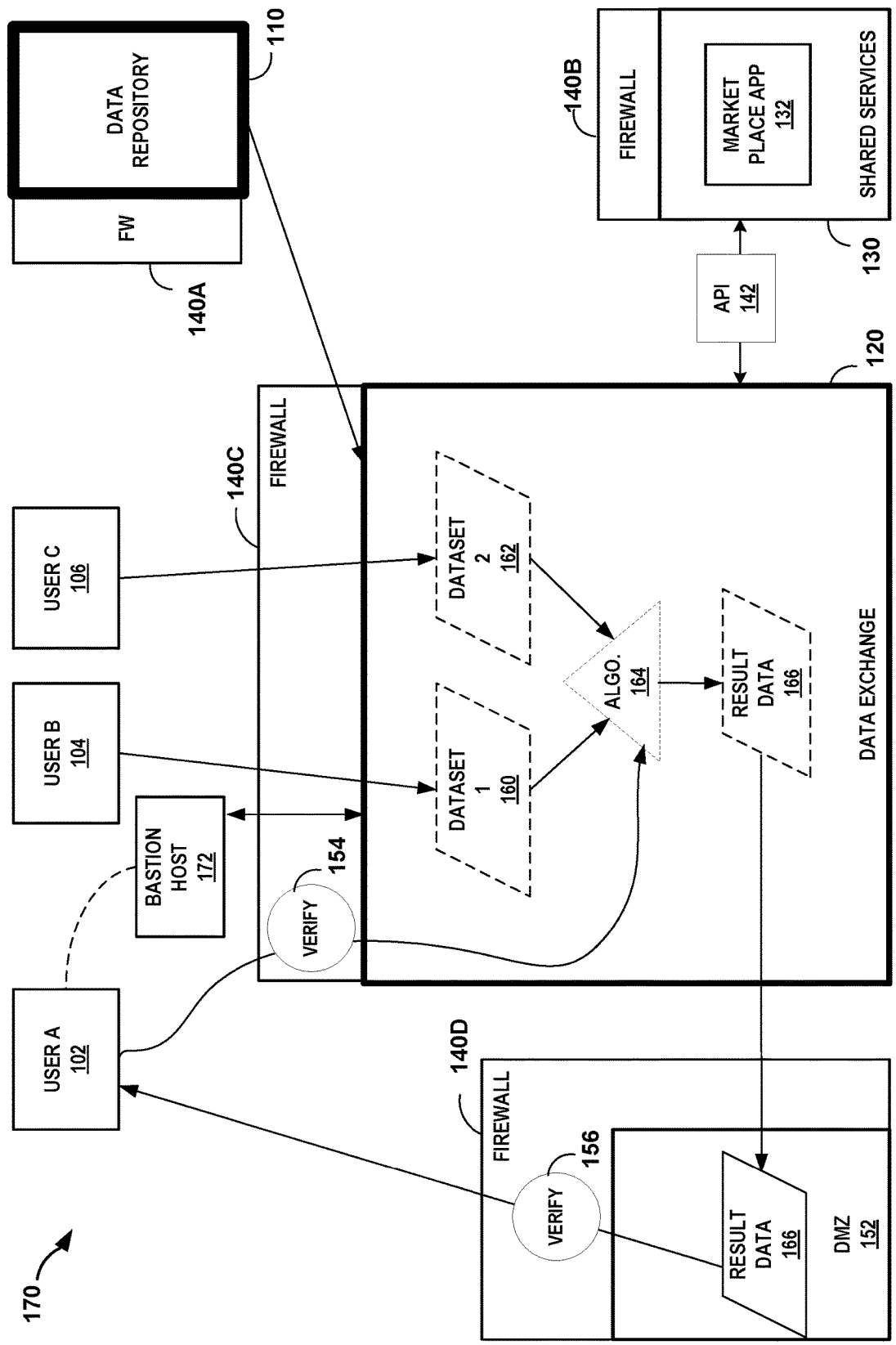

FIGS. 1A-1C are block diagrams that illustrate conceptual views of various aspects of multi-zone secure artificial intelligence (AI) exchanges according to techniques described herein. In some aspects, a user of a multi-zone secure AI exchange in the examples below may be a member of the multi-zone secure AI exchange.

FIG. 1A illustrates a conceptual view of a multi-zone secure AI exchange 100 according to techniques described herein. In some aspects, the multi-zone secure AI exchange 100 includes a data repository 110, a data exchange 120, and shared services 130. The data repository 110, data exchange 120, and shared services 130 may implement different levels of security using one or more security parameters to establish separate security zones within which the data repository 110, data exchange 120, and shared services 130 operate. Additionally, security controls may be implemented both within data repository 110, data exchange 120, and shared services 130 and in between the security zones established for data repository 110, data exchange 120, and shared services 130. In some aspects, the different levels of security may be implemented using firewalls 140A, 140B and 140C (collectively "firewalls 140"). The firewalls 140 may comprise conventional firewalls, or they may be firewalls that are enhanced with additional security features such as user based access and deep packet inspection.

Data repository 110 may be one or more servers configured to store algorithms and datasets. The algorithms and datasets in data repository 110 may be owned by a user (e.g., user A 102 or user B 104) that adds a respective algorithm 112 or dataset 114 to the data repository. Such a user can be referred to as an "owner." Additionally, a user may be required to be a member of a multi-zone secure AI exchange 100 before being allowed to access the exchange. A member may own a dataset or algorithm in the exchange, or may not own an algorithm or dataset, but may be allowed to use algorithms and datasets owned by other members. Data repository 110 may be segmented according to ownership such that datasets 114 and algorithms 112 may be compartmentalized to restrict access to the datasets 114 and algorithms 112 to their corresponding owners. In some aspects, the segmentation can be virtualized, such as through a virtual machine or virtual disk. Additionally, datasets 114 and algorithms 112 may be encrypted using encryption keys or other encryption methods to further ensure the security of the datasets 114 and algorithms 112. Encryption services may be provided by shared services 130, by an underlying operating system, or by a separate hardware encryption module (not shown).

In some aspects, an algorithm 112 may be a machine learning algorithm, a machine learning model, or a combination of the two. The machine learning model may be a fully or partially trained machine learning model. A dataset 114 may be a set of training data that may be used to train a machine learning model, or it may be a set of data that is operated on by a trained algorithm 112 to produce result data. The output result data of an algorithm 112 may include one or more predictions, inferences, or other results based on application of the algorithm 112 to the input dataset 114. The output result data may also include a trained AI model. User D 108 may obtain the output result data and execute the trained AI model in inference mode to input data to generate predictions.

In some aspects, data repository 110 may be a proprietary system, such as a set of one or more private servers. In some aspects, data repository 110 may be a public storage system such as a public cloud system. Further, in some aspects data repository 110 may be a combination of private and public systems.

Data exchange 120 may be one or more servers configured to receive datasets and algorithms from data repository 110 and provide data to a user (e.g., user A 102 or user B 104). For example, in some aspects, data exchange 120 may receive an algorithm 112 and a dataset 114 from data repository 110. The algorithm 112 may be performed on the dataset 114, and the resultant data provided to a user. In some aspects, the hardware architecture for the data exchange 120 may be optimized to perform algorithms 112 that involve analytics or machine learning. Additionally, a dataset 114 or algorithm 112 may be copied from data repository 110 and provided to a user via data exchange 120.

In some aspects, data exchange may be operated by a "trusted party," that is, a party that is trusted by the member users of the multi-zone secure AI exchange 100. In some aspects, transactions involving data exchange 120 are initiated by member users. Further, in some aspects, data exchange 120 is the only security zone that can receive data copied from the data repository 110.

Shared services 130 provides control plane and support services that manage transfers of algorithms 112 and datasets 114 from data repository 110 to data exchange 120. In some aspects, shared services 130 includes a marketplace application 132 that provides an interface for users to make requests to transfer datasets 114, perform algorithms 112, and provide result data to the requesting user. Shared services 130 may be provided (e.g., hosted) on a proprietary server, a public server such as a public cloud system, or a combination of proprietary and public systems.

Shared services 130 may maintain a metadata repository 134. Metadata repository 134 may store metadata about the algorithms and datasets stored in data repository 110. For example, metadata repository 134 may maintain a catalog describing available algorithms and datasets available in data repository 110. The metadata may include identifying information such as the names of the datasets and algorithms along with descriptions of the datasets and algorithms. The metadata may include other information such as the owners of the datasets and algorithms, the conditions under which the owners may allow use of their owned datasets and algorithms within the data exchange 120 etc.

In some aspects, shared services 130 does not have direct access to data repository 110 or data exchange 120. For example, shared services 130 may communicate with data repository 110 using messages to issue requests to data repository 110, which may respond to the requests as needed. In some aspects, shared services 130 may communicate with data exchange 120 via an Application Program Interface (API) 142. API 142 may provide a set of programs, functions, subroutines, or other software code facilitating interaction between the shared services 130 and data exchange 120. In some aspects, use of API 142 may be the only way to access to data exchange 120, thereby providing an additional level of security for the data exchange 120.

As noted above, each of data repository 110, data exchange 120 and shared services 130 may be configured with different levels of security. In some aspects, data repository 110 implements the highest level of security of the group. For example, data repository 110 may be configured such that only an owner of an algorithm 112 or dataset 114 is permitted to add their algorithm 112 or dataset 114 to data repository 110. Further, once in the data repository 110, only an owner of an algorithm 112 or dataset 114 may remove or change the algorithm 112 or dataset 114. Additionally, data repository 110 may be configured such that only an owner of an algorithm 112 or dataset 114 may be allowed to copy (or cause to be copied) their algorithm 112 or dataset 114 from data repository 110 to data exchange 120. Further, in some aspects, copying an algorithm 112 or dataset 114 to data exchange 120 must be initiated by the owner of the corresponding algorithm 112 or dataset 114. Moreover, in some aspects, data repository 110 must initiate communications with shared services 130.

The data exchange may implement a lower level of security than the data repository. The data exchange may allow data or algorithms to be received from the data repository at the request of an owning user. Thus, in some aspects, the security parameters for data exchange 120 may be configured to allow an algorithm owned by a first user to read a dataset owned by a second user without allowing the first user to otherwise access the dataset and without allowing the second user to access the algorithm. Further, in some aspects, the security parameters for data exchange 120 may be configured to allow a third user to access results of performing the algorithm using the dataset without allowing the third user to otherwise access the algorithm and the datasets used as input. Additionally, in some aspects, data exchange 120 may implement data loss prevention techniques to ensure that sensitive or critical information is not removed to any type of media (network and physical) from the data exchange 120 by unauthorized users.

In some aspects, data exchange 120 may include a proxy 116 that may terminate end user (e.g., user A 102 or user B 104) communication with the data exchange. In some aspects, the proxy 116 may be a web based front end provided by data exchange 120.

The shared services may be configured at a lowest level of security when compared with the data repository and data exchange. The security configuration of the shared services may require the user be authenticated and authorized using a trusted identity. Once authenticated and/or authorized, a user may make requests with respect to datasets and algorithms in the data repository and data exchange. The requests may be issued by both non-owning and owning users with respect to the algorithms and datasets. However, such requests may, if performed, be subject to the respective security requirements of the data repository and data exchange.

In the example illustrated in FIG. 1A, user A 102 has added algorithm 112 and dataset 114 to data repository 110, and is thus an owner of the algorithm 112 and dataset 114. User B 104 requests access to the algorithm 112 and dataset 114 via marketplace application 132. Marketplace application 132 may send a message to the owner (user A 102) to request that user A 102 grant or deny the access. In the example illustrated in FIG. 1A, user A 102 grants the access and copies the algorithm 112 and dataset 114 to the data exchange 120. User B 104 may perform the algorithm 112 using dataset 114 as input.

FIG. 1B illustrates a conceptual view of a multi-zone secure AI exchange 150 according to techniques described herein, and provides an example of multiple owner users providing AI services and data for a requesting user. In the example illustrated in FIG. 1B, user D 104 has issued a request to perform algorithm 164 owned by user A 102 using dataset 1 160 owned by user B 104 and dataset 2 162 owned by user C 106 as input. In response to approving the request, user A 102 copies the algorithm 164 from data repository 110 to data exchange 120. A verification operation 154 may take place to verify the copy of the algorithm 164. In some aspects, the verification operation 154 may check to ensure that the algorithm 164 has been approved for execution by the owner or a consortium of member users of the multi-zone secure AI exchange 150. In some aspects, the verification operation 154 may check to ensure that the copy placed in the data exchange 120 is the same as that originally placed in the data repository 110. For example, a checksum of the copy of algorithm 164 to be placed in the data exchange 120 may be generated and compared with a checksum of the algorithm 164 generated when the algorithm 164 was originally created by the owner (e.g., user A 102) in data repository 110, or updated by the owner. The checksum of the algorithm 164 as created or updated in data repository 110 may be maintained by shared services 130 in metadata repository 134.

User B 104 and user C 106 may approve use of their respective owned datasets 160 and 162. Upon receiving an indication of the approval of the owners (users B 104 and C 106), marketplace application 132 may copy datasets 160 and 162 to the data exchange 120. Marketplace application 132 may perform the algorithm 164 on datasets 160 and 162 to produce result data 166. Marketplace application 132 may copy result data 166 to demilitarized zone (DMZ) 152 for retrieval by user D 108. In some aspects, a verification operation 156 may be performed on the result data 166.

FIG. 1C illustrates a conceptual view of a multi-zone secure AI exchange 170 according to techniques described herein, and provides an example of an algorithm owner training or modifying the algorithm based on datasets provided by multiple owner users. The example multi-zone secure AI exchange 170 includes a bastion host 172. Bastion host 172 may host a limited number of applications used to administer the multi-zone secure AI exchange 170. Services that are not involved in the administration of multi-zone secure AI exchange 170 may not be present on bastion host 172. Various means may be used to provide additional security for bastion host 172 in order to prevent unauthorized access to multi-zone secure AI exchange 170. For example, the bastion host 172 may operate on a secure or segregated network such as a DMZ 152. Additional authentication and authorization requirements may be implemented for accessing the bastion host 172. For example, multi-factor authorization may be required in order to logon to bastion host 172.

In the example illustrated in FIG. 1C, user A 102 may want to test and refine an algorithm 164 owned by user A 102. Further, user A 102 may want to use datasets owned by user B 104 and user C 106 to test algorithm 164. User A 102 may log on to the multi-zone secure AI exchange 170 via bastion host 172, and copy algorithm 164 from data repository 110 to the data exchange 120. User A 102 may also request the use of datasets 160 and 162. If approved by the respective owners, user B 104 and user C 106, their datasets 160 and 162 may be copied from data repository 110 to data exchange 120. User A 102 may then perform algorithm 164 with datasets 160 and 162 as input to produce result data 166. Result data 166 may be copied out of the data exchange 120 via DMZ 152, where requesting user A 102 may retrieve the result data 166. As discussed above, the result data 166 may be verified with a verify operation 156 before being received by user A 102.

In addition to, or instead of, the security provided by firewalls 140, other security mechanisms may be used provide security for multi-zone secure AI exchange 100, 150, 170 and the transactions, messages, operations etc. provided by the various components of the AI exchange 100. The firewalls may enforce security parameters configured for the various components of AI exchange 100. For example, Transport Layer Security (TLS) may be implemented for communications between users and the marketplace application 132, data repository 110, and data exchange 120. As an example, the marketplace application may authenticate the identity of a user or member of the multi-zone secure AI exchange 100, 150, 170. Multifactor authentication may be implemented by the marketplace application 132, data repository 110 and data exchange 120 to authenticate the identity of a user or device. Single sign on (SSO) may be used to allow a user to sign on once to establish a session with the marketplace application, and the identity established by the SSO can be carried over to other components of the multi-zone secure AI exchange 100, 150, 170 such as the data exchange 120 and data repository 110. Shared services 130 may implement Digital Rights Management (DRM) to establish ownership and usage rights with respect to the algorithms and datasets stored in data repository 110. Messages and other communications between users, the marketplace application 132, data repository 110, data exchange 120, and shared services 130 may be tokenized to replace sensitive information (e.g., personally identifying information) with a non-sensitive equivalent (i.e., a token). Tokens can thus be used to anonymize the data in messages and in the datasets communicated from data repository 110 to data exchange 120. Data in messages or in datasets may be classified according to business rules. Metadata may be associated with the data in the datasets to identify the classification. In some aspects, the metadata may be stored in metadata repository 134. The metadata may be used to determine rights in the data, or control how the data is processed (e.g., if the data should be tokenized etc.). The various components of multi-zone secure AI exchange 100, 150, 170 may perform transaction logging to collect evidence of some or all of the transactions occurring on the system. The log may be used for trouble shooting or for establishing an audit trail. Shared services 130 may include a key manager to securely store and retrieve keys that can be used by the multi-zone secure AI exchange 100, 150, 170 for encryption of data as it is communicated between the data repository 110 and data exchange 120. The keys may also be used for tokenization.

Multi-zone secure AI exchange 100, 150, 170 may include other components not shown in FIG. 1 to avoid obfuscating the disclosure. For example, a Secure Incident and Event Management (SIEM) component may perform real-time analysis and correlation of logs and alerts generated by the various applications, algorithms, and network elements that may be a part of multi-zone secure AI exchange 100, 150, 170. A secure Domain Name Service (DNS) may be used to translate logical web names or Uniform Resource Locators (URLs) to IP addresses. The use of a secure DNS may be desirable because web names or URLs may be a basis for some or all of the communications within the multi-zone secure AI exchange 100, 150, 170 and with end users. Further, physical security techniques may be used to enhance the security of multi-zone secure AI exchange 100, 150, 170. For example, the hardware used to implement the data repository 110, data exchange 120, and shared services 130 may be in physical locations that have restricted access such that only authorized staff can access network devices and hardware hosting the software and firmware used to implement the data repository 110, data exchange 120, and shared services 130.

Figure 2A:
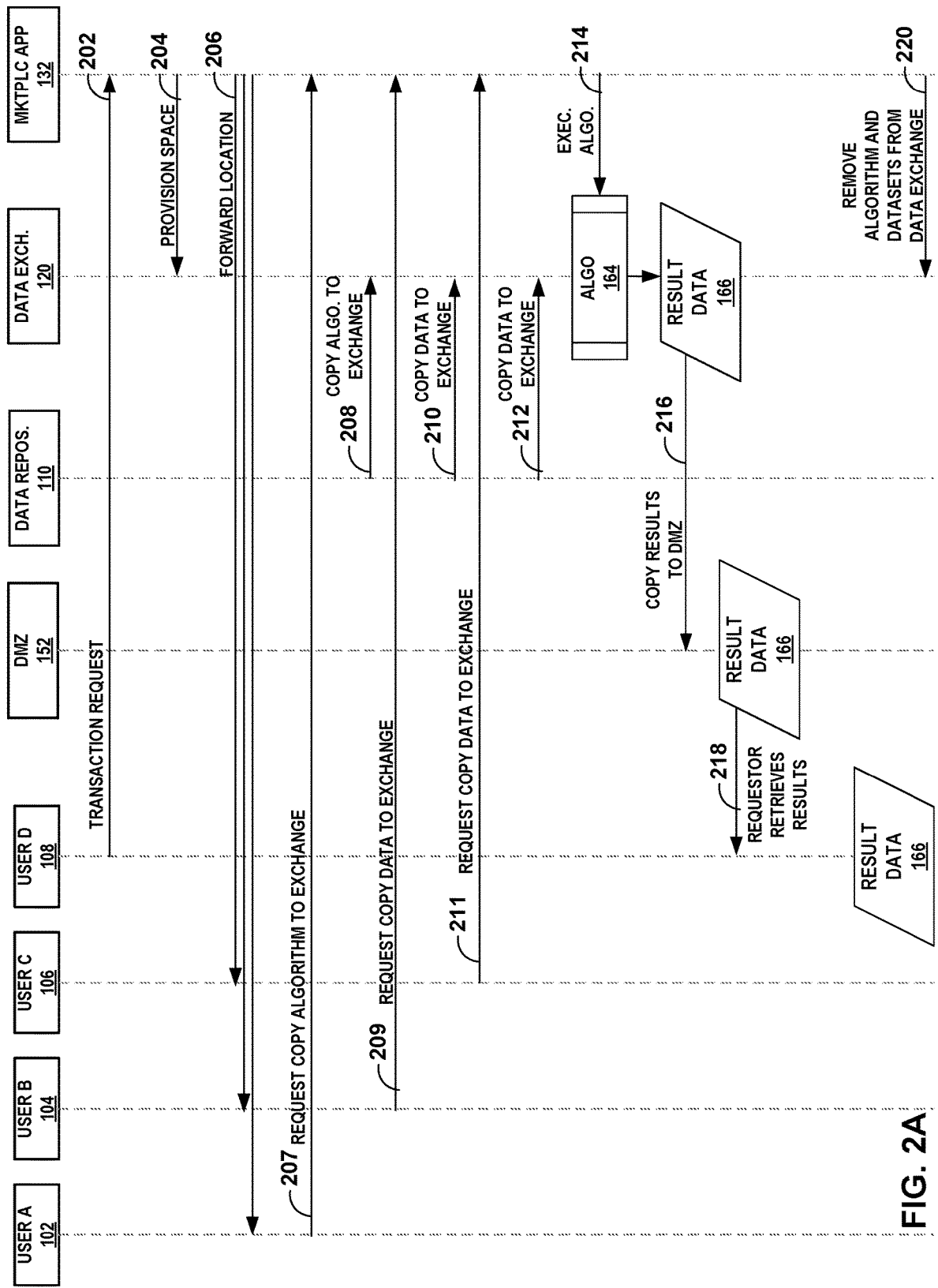
FIGS. 2A and 2B are sequence diagrams illustrating example operations performed by components of the multi-zone secure AI exchange and hub according to techniques described herein.

FIG. 2A is a sequence diagram illustrating example operations performed by components of the multi-zone secure AI exchange 100, 150, 170 according to techniques described herein. The example illustrated in FIG. 2A may represent a sequence of operations in a production environment in which multiple owner users provide AI services and data for a requesting user. For the purposes of the example illustrated in FIG. 2A, assume that user A 102 has copied an algorithm owned by user A 102 into data repository 110, and that users B 104 and C 106 have copied datasets 160, 162 that they own into data repository 110. The sequence of operations in FIG. 2A provides further details with respect to the example multi-zone secure AI exchange and hub 150 configuration illustrated in FIG. 1B, and the discussion of FIG. 2A will make reference to elements shown in FIG. 1B.

The sequence of operations shown in FIG. 2A starts with user D 108 issuing a transaction request to perform algorithm 164 using datasets 160 and 162 (202) as input. In some aspects, the request is transmitted to marketplace application 132. Marketplace application 132 may perform authentication and authorization checks to ensure that user D 108 is authorized to access the multi-zone secure AI exchange 100, 150, 170 to perform transactions. Additionally, marketplace application 132 may issue queries to the owners of the algorithm and dataset specified in the transaction request to determine if the owners authorize the use of their respective algorithm and dataset by the requesting user.

If user D 108 is authorized to use the system and the requested algorithm and datasets, the transaction request may be approved. The marketplace application 132 may provision a storage space on data exchange 120 (204). The provisioned space may be used to temporarily store the algorithms and datasets specified in the transaction request of operation 202. In some aspects, marketplace application 132 may provision a separate space in the data exchange 120 for each owner of a dataset or algorithm. In some aspects, the marketplace application 132 may configure the first space with different security parameters than the second space. For example, each of the separate spaces may be configured to allow access to its respective owner and disallow access to others. In some aspects, marketplace application 132 may provision a single space for a transaction, and each algorithm or dataset specified in the transaction request may be configured to allow access to its corresponding owner. The marketplace application 132 may notify the respective owners of the algorithm and datasets of the location of the provisioned space on data exchange 120 (206).

The respective owners of the algorithms and datasets may copy their algorithms and datasets to the provisioned space on data exchange 120. In the example illustrated in FIG. 2A, user A 102, the owner of the algorithm specified in the transaction request, issues a request to marketplace application 132 that the specified algorithm be copied from the data repository 110 to the data exchange 120 (207). In response, marketplace application 132 copies the algorithm specified in the transaction request from the data repository 110 to the data exchange 120 (208). User B 104, the owner of dataset 160 specified in the transaction request, issues a request to the marketplace application 132 to copy the specified dataset 160 from the data repository 110 to the data exchange 120 (209). In response, marketplace application 132 performs the requested copy (210). Similarly, user C 106, the owner of dataset 162 specified in the transaction request, issues a request to the marketplace application 132 to copy the specified dataset 162 from the data repository 110 to the data exchange 120 (211). In response, marketplace application 132 performs the requested copy (212).

When the algorithm 164 and datasets 160, 162 have been copied to the data exchange 120, marketplace application 132 may initiate performance of algorithm 164 using datasets 160 and 162 as input (214). Performance of algorithm 164 may produce result data 166. Result data 166 may be copied to DMZ 152 (216).

User D 108 may retrieve result data 166 from DMZ 152 when it is available (218). In some aspects, result data 166 may be verified prior to being provided to user D 108.

Optionally, marketplace application 132 may remove the algorithm 164 and datasets 160, 162 from the data exchange 120 (220). In some aspects, algorithm 164 and datasets 160, 162 may be removed after result data 166 has been copied to the DMZ 152. In some aspects, algorithm 164 and datasets 160, 162 may be removed after a predetermined or configurable amount of time has elapsed. For example, the algorithm 164 and datasets 160, 162 may be removed after a predetermined or configurable amount of time (e.g., a time-to-live (TTL)) has elapsed from when the algorithm 164 and datasets 160, 162 were copied to the data exchange 120. In some aspects, the algorithm 164 and datasets 160, 162 are deleted from file storage on data exchange 120. In some aspects, the contents of algorithm 164 and datasets 160, 162 may be written over with zeros, ones, randomized data, or other data patterns to prevent recovery of the algorithm 164 and datasets 160, 162 by an unauthorized party.

It should be noted that the operations illustrated in the sequence diagram of FIG. 2A may be performed in a different order than shown in FIG. 2A. For example, the requests and copies of operations 207-212 may be performed in a different order. Further, some or all of the operations illustrated in FIG. 2A may be performed in parallel with one another.

Figure 2B:
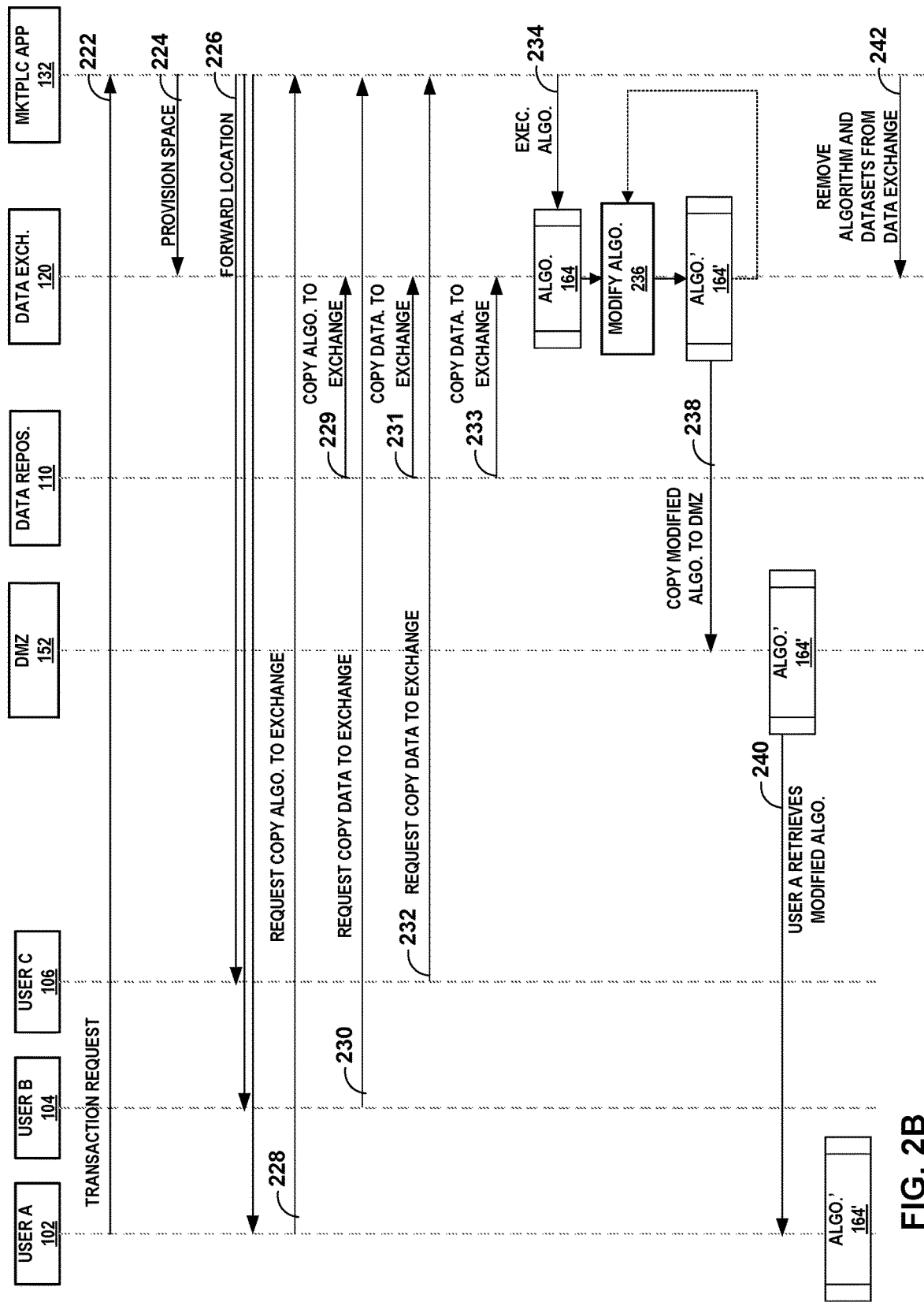

FIG. 2B is a sequence diagram illustrating example operations performed by components of the multi-zone secure AI exchange 100, 150, 170 according to techniques described herein. The example illustrated in FIG. 2B may represent a sequence of operations in a training environment in which an owner of an algorithm trains the algorithm or data model produced by the algorithm using input data owned by other users. For the purposes of the example illustrated in FIG. 2B, assume that user A 102 has copied an algorithm owned by user A 102 into data repository 110, and that users B 104 and C 106 have copied datasets 160, 162 that they own into data repository 110. The sequence of operations in FIG. 2B provides further details with respect to the example multi-zone secure AI exchange and hub 170 configuration illustrated in FIG. 1C, and the discussion of FIG. 2B will make reference to elements shown in FIG. 1C.

The sequence of operations shown in FIG. 2B starts with user A 102 issuing a transaction request to perform algorithm 164 using datasets 160 and 162 (222) as input. In some aspects, the request is transmitted to marketplace application 132. Marketplace application 132 may issue queries to the owners of the datasets specified in the transaction request to determine if the owners authorize the use of their dataset by the requesting user (user A 102).

If user A 102 is authorized to use the datasets, the transaction request may be approved. The marketplace application 132 may provision a storage space on data exchange 120 (224). In some aspects, marketplace application 132 may provision a separate space in the data exchange 120 for each owner of a dataset or algorithm, and each of the separate spaces may be configured to allow access to the owner. In some aspects, marketplace application 132 may provision a single space for a transaction, and each algorithm or dataset specified in the transaction request may be configured to allow access to its corresponding owner. The provisioned space may be used to temporarily store the algorithms and datasets specified in the transaction request of operation 222. The marketplace application 132 may notify the respective owners of the algorithm and datasets of the location of the provisioned space on data exchange 120 (226).

The respective owners of the algorithms and datasets may copy their algorithms and datasets to the provisioned space on data exchange 120. In the example illustrated in FIG. 2B, user A 102, the owner of the algorithm specified in the transaction request, issues a request to marketplace application 132 that the specified algorithm be copied from the data repository 110 to the data exchange 120 (228). In response, marketplace application 132 copies the algorithm specified in the transaction request from the data repository 110 to the data exchange 120 (229). User B 104, the owner of dataset 160 specified in the transaction request, issues a request to the marketplace application 132 to copy the specified dataset 160 from the data repository 110 to the data exchange 120 (230). In response, marketplace application 132 performs the requested copy (231). Similarly, user C 106, the owner of dataset 162 specified in the transaction request, issues a request to the marketplace application 132 to copy the specified dataset 162 from the data repository 110 to the data exchange 120 (232). In response, marketplace application 132 performs the requested copy (233).

When the algorithm 164 and datasets 160, 162 have been copied to the data exchange 120, marketplace application 132 may initiate performance of algorithm 164 using datasets 160 and 162 as input (214). Depending on the results of the algorithm 164, user A 102 may modify (e.g., train) the algorithm or a machine learning model used by the algorithm (236). For example, user A 102 may execute software that compares the results of performing the algorithm 164 with expected results, and use the comparison to modify the algorithm or machine learning model used by the algorithm 164. Optionally, the modified algorithm 164' may be performed iteratively, with each iteration potentially resulting in a further modification of the algorithm 164' or machine learning model used by the algorithm 164'. Modifications to the algorithm 164 (or modified algorithm 164') may continue until a result satisfactory to the algorithm's owner, user A 102, is achieved. The modified algorithm 164' and/or machine learning model may be copied to a DMZ (238).

User A 102 may retrieve the modified algorithm 164' from the DMZ 152 when it is available (240). In some aspects, the modified algorithm 164' may be verified prior to being provided to user A 102.

Optionally, marketplace application 132 may remove the algorithm 164, algorithm 164' and datasets 160, 162 from the data exchange 120 (242). In some aspects, algorithm 164 and datasets 160, 162 may be removed after result data 166 has been copied to DMZ 152. In some aspects, algorithm 164, algorithm 164' and datasets 160, 162 may be removed after a predetermined or configurable amount of time. In some aspects, the algorithm 164, algorithm 164' and datasets 160, 162 are deleted from file storage on data exchange 120. In some aspects, the contents of algorithm 164, algorithm 164' and datasets 160, 162 may be written over with zeros, ones, randomized data, or other data patterns to prevent recovery of the algorithm 164, algorithm 164' and datasets 160, 162 by an unauthorized party.

It should be noted that the operations illustrated in the sequence diagram of FIG. 2B may be performed in a different order than shown in FIG. 2B. For example, the requests and copies of operations 228-233 may be performed in a different order. Further, some or all of the operations illustrated in FIG. 2B may be performed in parallel with one another.

Figure 3:
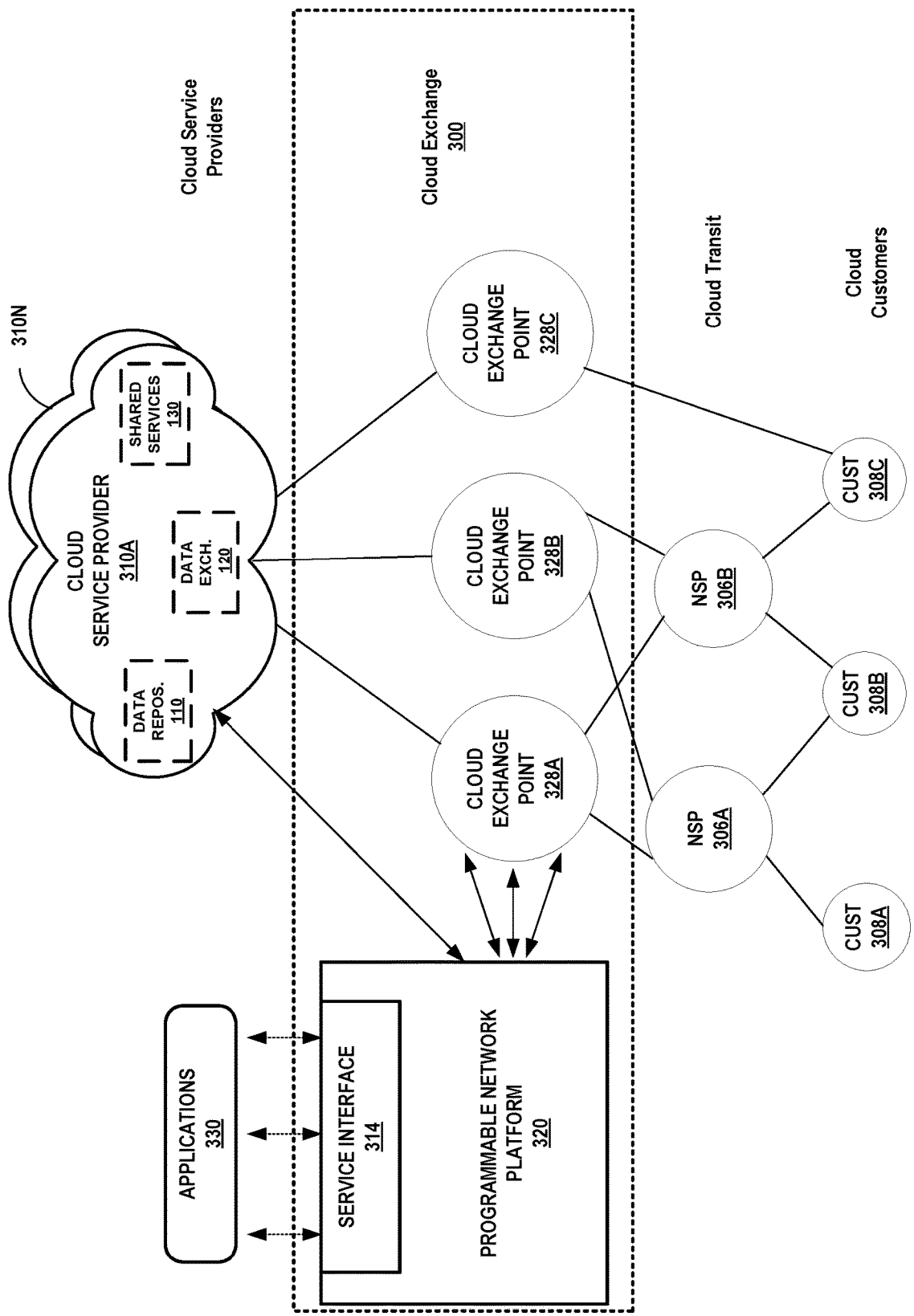
FIG. 3 is a block diagram that illustrates a conceptual view of a network system having a metro-based cloud exchange that provides multiple cloud exchange points according to techniques described herein.
Figure 4:
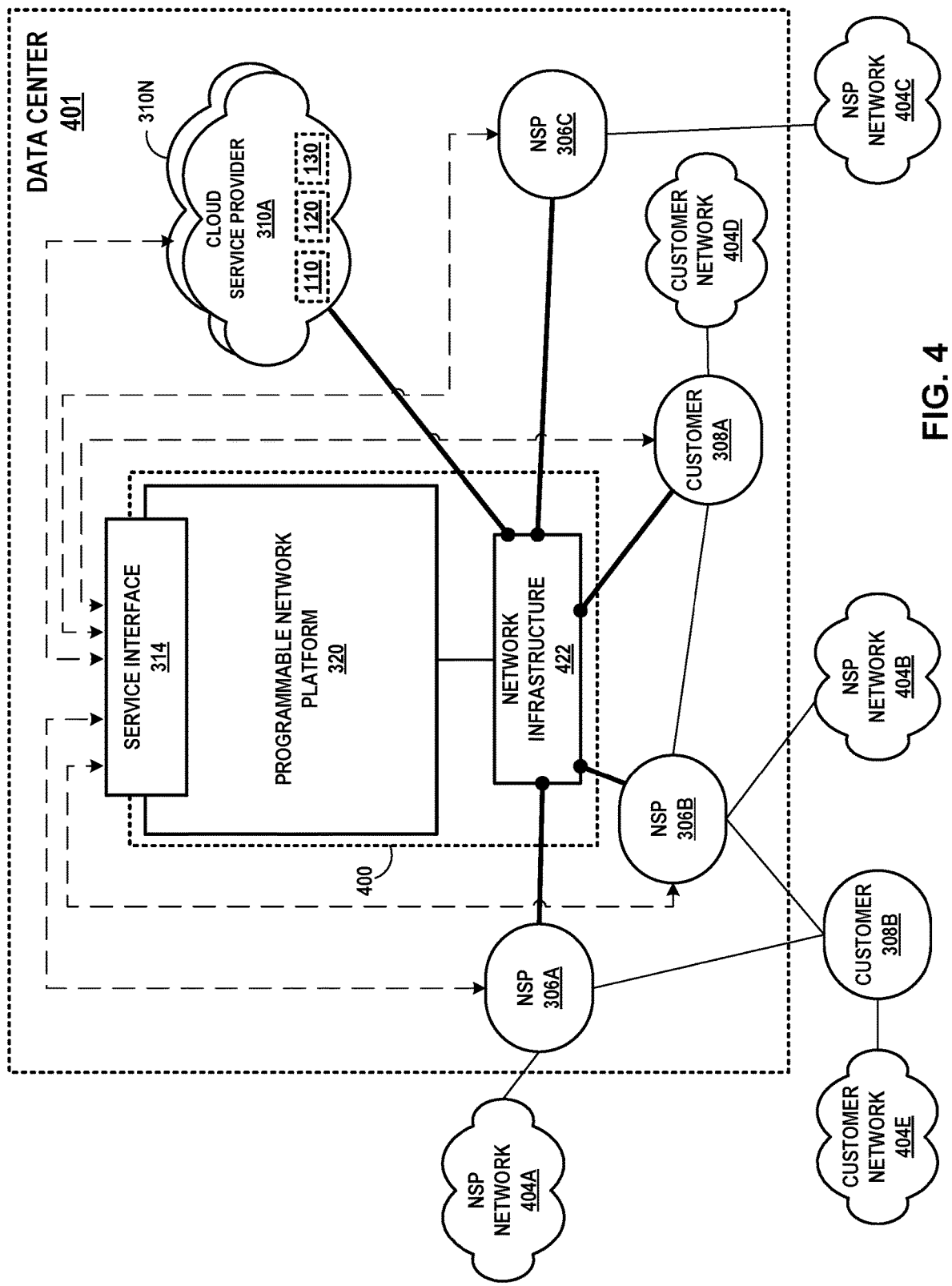
FIG. 4 is a block diagram illustrating a high-level view of a data center that provides an operating environment for a cloud-based services exchange, according to techniques described herein.

FIGS. 3 and 4 show various network systems and components that may be used to implement a multi-zone AI exchange 100, 150, 170 as illustrated above in FIGS. 1A-1C.

FIG. 3 illustrates a conceptual view of a network system having a metro-based cloud exchange that provides multiple cloud exchange points according to techniques described herein. The multiple cloud exchange points may be used to implement, at least in part, a multi-zone AI exchange 100, 150, 170. Each of cloud-based services exchange points 328A-328D (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, New York; Silicon Valley, California; Seattle-Tacoma, Washington; Minneapolis-St. Paul, Minnesota; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which cloud customers 308A-308D (collectively, "cloud customers 308") receive cloud services from multiple cloud service providers 310A-310N (collectively, "cloud service providers 310"). The cloud service provides 310 may host one of more of data repository 110, data exchange 120 and shared services 130. As noted above, the cloud service providers 310 may be public or private cloud service providers.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

Cloud customers 308 may receive cloud-based services directly via a layer 3 peering and physical connection to one of cloud exchange points 328 or indirectly via one of network service providers 306A-306B (collectively, "NSPs 306," or alternatively, "carriers 306"). Cloud customers 308 may include customers of the multi-zone secure AI exchange 100, 150, 170 described above. For example, cloud customers 308 may include systems used by any or all of user 1 102, user 2 104, user 3 106 and user 4 108 to access the multi-zone secure AI exchange 100, 150, 170. NSPs 306 provide "cloud transit" by maintaining a physical presence within one or more of cloud exchange points 328 and aggregating layer 3 access from one or customers 308. NSPs 306 may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C, in contrast, is illustrated as having contracted with the cloud exchange provider for cloud exchange 300 to directly access layer 3 cloud services via cloud exchange point 328C and also to have contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customer customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. The programmable network platform 320 may, as a result, orchestrate a business-level service across heterogeneous cloud service providers 310 according to well-defined service policies, quality of service policies, service level agreements, and costs, and further according to a service topology for the business-level service. As an example, programmable network platform 320 may implement some or all of the functionality described herein provided by data exchange 120 (FIGS. 1A-1C and 2).

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable cloud customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a cloud customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

FIG. 4 is a block diagram illustrating a high-level view of a data center 401 that provides an operating environment for a cloud-based services exchange 400, according to techniques described herein. Cloud-based services exchange 400 ("cloud exchange 400") allows a corresponding one of customer networks 404D, 404E and NSP networks 404A-404C (collectively, "'private' or 'carrier' networks 404") of any NSPs 306A-306C or other cloud customers including customers 308A, 308B to be directly connected, via a layer 3 (L3) or layer 2 (L2) connection to any other customer network and/or to any of cloud service providers 310A-310N, thereby allowing exchange of cloud service traffic among the customer networks and/or CSPs 310. Data center 401 may be entirely located within a centralized area, such as a warehouse or localized data center complex, and provide power, cabling, security, and other services to NSPs, customers, and cloud service providers that locate their respective networks within the data center 401 (e.g., for co-location) and/or connect to the data center 401 by one or more external links.

Network service providers 306 may each represent a network service provider that is associated with a transit network by which network subscribers of the NSP 306 may access cloud services offered by CSPs 310 via the cloud exchange 400. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 400.

In this way, cloud exchange 400 streamlines and simplifies the process of partnering CSPs 310 and customers 308 (indirectly via NSPs 306 or directly) in a transparent and neutral manner. One example application of cloud exchange 400 is a co-location and interconnection data center in which CSPs 310, NSPs 306 and/or customers 308 may already have network presence, such as by having one or more accessible ports available for interconnection within the data center. This allows the participating carriers, customers, and CSPs to have a wide range of interconnectivity options in the same facility.

Cloud exchange 400 of data center 401 includes network infrastructure 422 that provides a L2/L3 switching fabric by which CSPs 310 and customers/NSPs interconnect. This enables an NSP/customer to have options to create many-to-many interconnections with only a one-time hook up to the switching network and underlying network infrastructure 422 that presents an interconnection platform for cloud exchange 400. In other words, instead of having to establish separate connections across transit networks to access different cloud service providers or different cloud services of one or more cloud service providers, cloud exchange 400 allows customers to interconnect to multiple CSPs and cloud services using network infrastructure 422 within data center 401, which may represent any of the edge networks described in this disclosure, at least in part.

By using cloud exchange 400, customers can purchase services and reach out to many end users in many different geographical areas without incurring the same expenses typically associated with installing and maintaining multiple virtual connections with multiple CSPs 310. For example, NSP 306A may expand its services using network 404B of NSP 306B. By connecting to cloud exchange 400, an NSP 306 may be able to generate additional revenue by offering to sell its network services to the other carriers. For example, NSP 306C may offer the opportunity to use NSP network 404C to the other NSPs.

Cloud exchange 400 includes an programmable network platform 320 that exposes at least one service interface, which may include in some examples and are alternatively referred to herein as application programming interfaces (APIs) in that the APIs define the methods, fields, and/or other software primitives by which applications may invoke the programmable network platform 320. As an example, the functionality provided by data exchange 120 may be implemented on programmable network platform 320. The software interfaces allow NSPs 306 and customers 308 programmable access to capabilities and assets of the cloud exchange 400. The programmable network platform 320 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 400 (e.g., customers 308 and NSPs 306) to create software applications (e.g., marketplace application 132 (FIGS. 1A-1C and 2)) that allow and leverage access to the programmable network platform 320 by which the applications may request that the cloud exchange 400 establish connectivity between the customer and cloud services offered by any of the CSPs 310. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 314 facilitates machine-to-machine communication to enable dynamic service provisioning and service delivery assurance. In this way, the programmable network platform 320 enables the automation of aspects of cloud services provisioning. For example, the software interfaces may provide an automated and seamless way for customers to establish, de-install and manage interconnection with or between multiple, different cloud providers participating in the cloud exchange. The programmable network platform 320 may in various examples execute on one or virtual machines and/or real servers of data center 401, or off-site.

In the example of FIG. 4, network infrastructure 422 represents the cloud exchange switching fabric and includes multiple ports that may be dynamically interconnected with virtual circuits by, e.g., invoking service interface 314 of the programmable network platform 320. Each of the ports is associated with one of carriers 306, customers 308, and CSPs 310.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 310.

Figure 6:
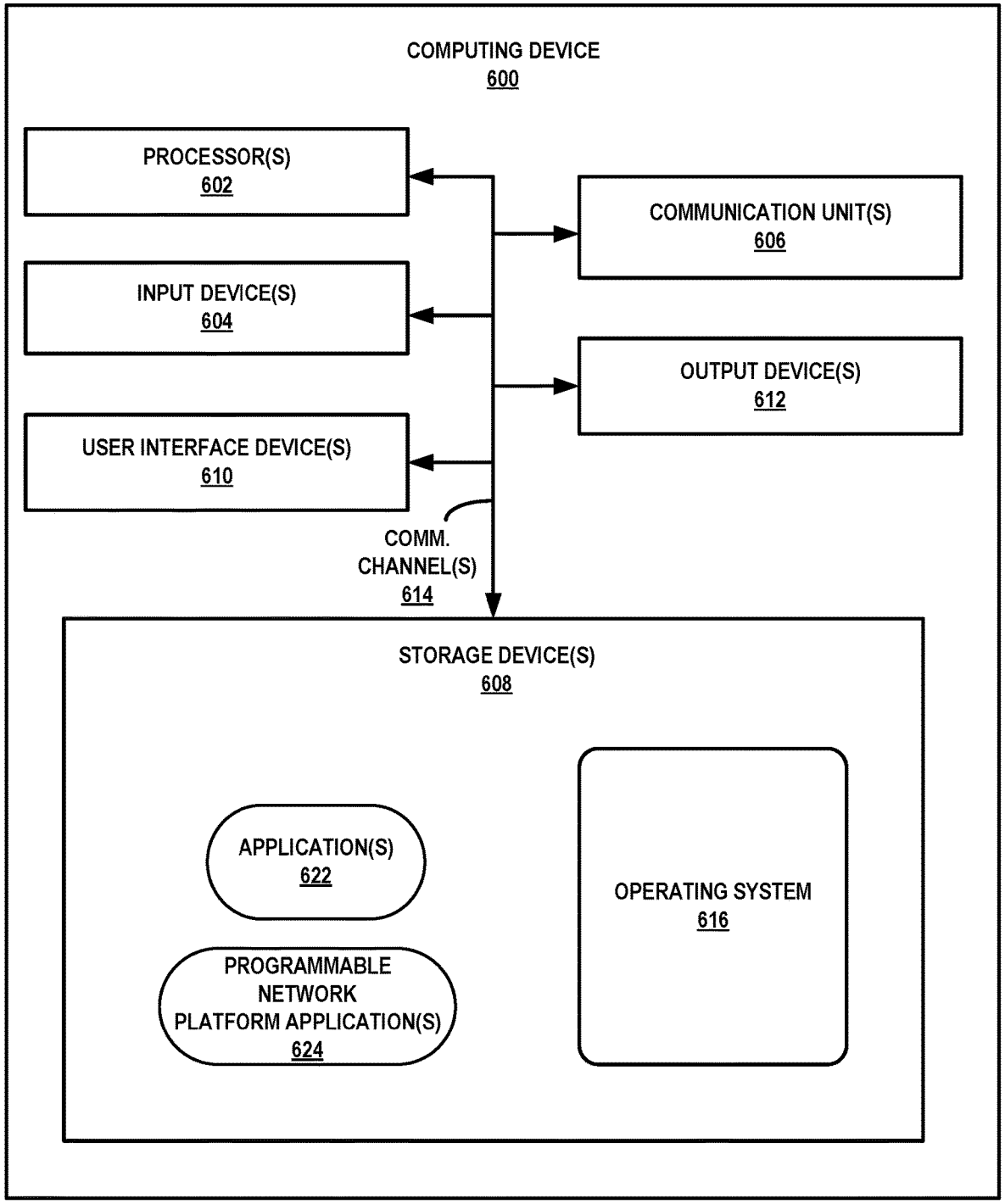
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing any one or more of the programmable network platform components, or any other system, application, or module described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, programmable network platform application(s) 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622 and programmable network platform application(s) 624 with processors 602, communication unit 606, storage device 608, input device 604, user interface devices 610, and output device 612.

Application 622 and programmable network platform application(s) 624 may also include program instructions and/or data that are executable by computing device 600. Example programmable network platform application(s) 624 executable by computing device 600 may include application and/or other software to implement capabilities provided by data repository 110, data exchange 120 and/or shared service 130.

Figure 5:
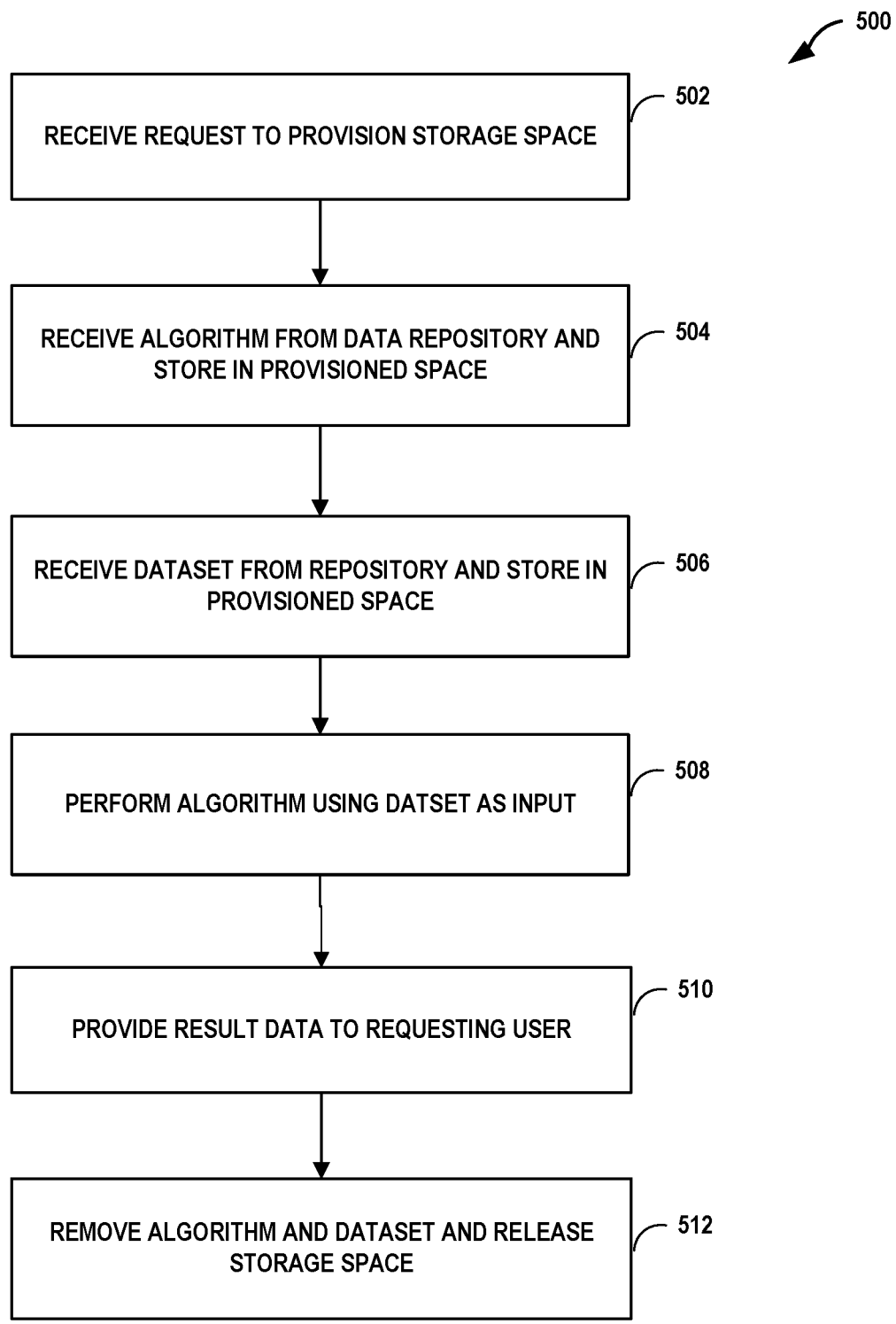
FIG. 5 is a flowchart illustrating example operations for a multi-zone AI exchange according to techniques described in this disclosure.

FIG. 5 is a flowchart illustrating example operations for a data exchange 120 of a multi-zone secure AI exchange 100, 150, 170 including the data exchange 120, a data repository 110 and a marketplace application 132. The example operations illustrated in FIG. 5 may be performed in response to a transaction request initiated by a user (e.g., a "requesting user") received by the marketplace application 132. The data exchange 120 can receive a request from the marketplace application 132 to provision space for algorithms and datasets specified in the transaction request (502). The data exchange 120 may receive an algorithm specified in the transaction request from data repository 110 (504). The received algorithm may be stored in the provisioned storage space. The data exchange 120 may receive one or more datasets specified in the transaction request, and store the received datasets in the provisioned space (506).

The data exchange may perform the algorithm using the one or more datasets as input to generate result data (508). The result data may be provided to the requesting user (510). As discussed above, while the requesting user can access the result data, the requesting user may not have any access to the algorithm used to produce the result data and may not have access to the datasets used as input to the algorithm. In some aspects, the requesting user may be able to access the result data directly from the data exchange. In some aspects, the data exchange may copy the results to a DMZ 152.

In some aspects, the algorithm and datasets may be removed from the data exchange after the result data has been generated. In some aspects, the data exchange itself may remove the algorithm and input datasets. In some aspects, the algorithm and datasets may be removed at the request of the marketplace application. In some aspects, the storage space occupied by the algorithm and datasets may be written over with zeros, ones, or other data values to prevent any access to the algorithm and datasets.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A data exchange comprising:
   one or more processors; and
   a computer-readable medium having instructions that, when executed, cause the one or more processors to:
   receive, in response to a command issued by an application associated with a first set of security parameters, one or more of a plurality of datasets and one or more of a plurality of algorithms from a data repository, the data repository configured to store the plurality of datasets and the plurality of algorithms, each of the plurality of datasets associated with a corresponding dataset owner and each of the plurality of algorithms associated with a corresponding algorithm owner, the data repository associated with a second set of security parameters,
   selectively allow access to the one or more of the plurality of datasets by the one or more of the plurality of algorithms in accordance with the first set of one or more security parameters, and
   selectively allow access to result data produced by the one or more of the plurality of algorithms in accordance with the first set of one or more security parameters;
   wherein the data exchange is associated with a third set of one or more security parameters.

2. The data exchange of claim 1, wherein the third set of one or more security parameters associated with the data exchange are configured to provide a higher level of security than the first set of one or more security parameters associated with the application, and a lower level of security than the second set of one or more security parameters associated with the data repository.

3. The data exchange of claim 1, wherein the second set of one or more security parameters associated with the data repository are configured to restrict access to each of the plurality of datasets to the corresponding dataset owner and each of the plurality of algorithms to the corresponding algorithm owner.

4. The data exchange of claim 1, wherein the third set of one or more security parameters associated with the data exchange are configured to allow access to the corresponding dataset owner of the one or more of the plurality of datasets and the corresponding algorithm owner of the one or more of the plurality of algorithms, and a user granted access by the corresponding dataset owner or the corresponding algorithm owner.

5. The data exchange of claim 1, wherein the first set of one or more security parameters associated with the application are configured to allow access to the application by one or more members of the data exchange, the one or more members including the corresponding dataset owner and the corresponding algorithm owner.

6. The data exchange of claim 1, wherein the third set of one or more security parameters are configured to allow an algorithm owned by a first user to read a dataset owned by a second user without allowing the first user to access the dataset and without allowing the second user to access the algorithm.

7. The data exchange of claim 6, wherein the third set of one or more security parameters are configured to allow a third user to access results of performing the algorithm using the dataset without allowing the third user to otherwise access the algorithm and the dataset.

8. The data exchange of claim 1, wherein the one or more of a plurality of algorithms comprise an algorithm owned by a first user, wherein the one or more of a plurality of datasets comprise a dataset owned by a second user, wherein selectively allowing access comprises allowing access to a requesting user, and wherein the instructions further cause the one or more processors to generate the result data by performing the algorithm owned by the first user using the dataset owned by the second user as input.

9. The data exchange of claim 8, wherein the instructions further cause the one or more processors to remove the algorithm owned by the first user and the dataset owned by the second user from the data exchange.

10. The data exchange of claim 8, wherein the instructions further cause the one or more processors to configure a fourth set of security parameters for the data exchange to allow the requesting user to access the result data and to disallow access by the requesting user to the algorithm owned by the first user and the dataset owned by the second user.

11. The data exchange of claim 8, wherein making the result data available for use by the requesting user comprises copying the result data to a system configured as a demilitarized zone.

\* \* \* \* \*